(12) United States Patent
Golub et al.

(10) Patent No.: US 6,325,510 B1
(45) Date of Patent: Dec. 4, 2001

(54) PROGRESSIVE MULTIFOCAL LENS CONSTRUCTION FOR EYEGLASSES

(75) Inventors: Michael Golub; Israel Grossinger, both of Rehovot (IL)

(73) Assignee: Holo Or Ltd., Rechovot (IL)

( * ) Notice: Subject to any disclaimer, the term of this patent is extended or adjusted under 35 U.S.C. 154(b) by 0 days.

(21) Appl. No.: 09/623,608

(22) PCT Filed: Mar. 4, 1999

(86) PCT No.: PCT/IL99/00128

§ 371 Date: Oct. 11, 2000

§ 102(e) Date: Oct. 11, 2000

(87) PCT Pub. No.: WO99/45425

PCT Pub. Date: Sep. 10, 1999

(30) Foreign Application Priority Data

Mar. 5, 1998 (IL) ............................................... 123574

(51) Int. Cl.⁷ ....................................................... G02C 7/06
(52) U.S. Cl. ............................................................. 351/169
(58) Field of Search .................... 351/169, 168, 351/170–172

(56) References Cited

U.S. PATENT DOCUMENTS

| | | | |
|---|---|---|---|
| D. 363,079 | 10/1995 | Keong | D16/300 |
| 3,004,470 | 10/1961 | Ruhle | 359/721 |
| 4,162,122 | 7/1979 | Cohen | 351/161 |
| 4,210,391 | 7/1980 | Cohen | 351/161 |
| 4,338,005 | 7/1982 | Cohen | 351/161 |
| 4,340,283 | 7/1982 | Cohen | 351/161 |
| 4,637,697 | 1/1987 | Freeman | 351/161 |
| 4,641,934 | 2/1987 | Freeman | 351/159 |
| 4,642,112 | 2/1987 | Freeman | 623/6.3 |
| 4,950,057 | 8/1990 | Shirayanagi | 351/169 |
| 4,995,714 | 2/1991 | Cohen | 351/161 |
| 5,100,226 | 3/1992 | Freeman | 351/160 R |
| 5,235,441 | 8/1993 | Georgaras et al. | 359/15 |
| 5,272,495 | 12/1993 | Pedrono | 351/169 |
| 5,285,222 | 2/1994 | Waido | 351/169 |
| 5,359,444 | 10/1994 | Piosenka et al. | 351/94 |
| 5,384,606 | 1/1995 | Koch et al. | 351/158 |
| 5,506,630 | 4/1996 | Ueno et al. | 351/169 |
| 5,715,032 | 2/1998 | Isenberg | 351/169 |

OTHER PUBLICATIONS

Wilfrid B. Veldkamp and Thomas J. McHugh, "Binary Optics", Scientific American, May 1992, pp. 50–55.

*Primary Examiner*—Jordan M. Schwartz
(74) *Attorney, Agent, or Firm*—Eitan, Pearl, Latzer & Cohen-Zedek

(57) ABSTRACT

A progressive multifocal lens for eyeglasses formed along a principle meridian curve, with a farsighted vision zone (1) having an optical power corresponding to that required for viewing distant objects, a nearsighted vision zone (3) having an optical power corresponding to that required for viewing near objects, and an intermediate vision zone (2) between and progressively connecting the farsighted vision zone and the nearsighted vision zone, includes a transparent, non-rotationally-symmetrical, microrelief structure in one or more of these vision zones.

19 Claims, 2 Drawing Sheets

PROGRESSIVE MULTIFOCAL LENS CONSTRUCTION FOR EYEGLASSES

FIELD OF THE INVENTION

The present invention relates to progressive multifocal lens constructions for use in eyeglasses.

BACKGROUND OF THE INVENTION

Progressive multifocal lenses as used in eyeglasses, or spectacles, comprise, along a principle meridian curve; a farsighted vision zone having an optical power corresponding to that required for viewing distant objects; a nearsighted vision zone having an optical power corresponding to that required for viewing near objects; and an intermediate vision zone between and progressively connecting the farsighted vision zone and the nearsighted vision zone. Progressive eyeglasses thus ensure different optical powers in upper and lower portion of each spectacle lens gradually increasing towards the lower periphery. However, strong problems with aberration correction exist. The oblique rays of near objects pass through the spectacle lens at peripheral parts such that they usually produce astigmatism and/or other aberrations. The degree of astigmatism is also high for the right and left peripheral parts of the spectacle lens responsible for side vision, thus loosing comfort in vision.

Traditional technology for spectacles lens fabrication based on refractive optics provides very limited possibilities in aberration correction. The important parameters: optical power, near and far vision ability, lens thickness, and aberration rate, are in a tradeoff relation and cannot be achieved all together. For example changing the local slope of the lens surface for aberration correction immediately influences lens thickness and might change also optical powers for far or/and near vision.

OBJECTS AND BRIEF SUMMARY OF THE INVENTION

An object of the present invention is to provide progressive multifocal lenses for eyeglasses having advantages in the above respects. Another object of the invention is to provide progressive multifocal lenses for eyeglasses which are not subject to the above-described limitations for correcting astigmatism and/or other abberations.

According to a broad aspect of the present invention, there is provided a progressive multi-focal lens comprising the three vision zones mentioned above common to all progressive lenses, but characterized in that at least one of the vision zones includes a transparent, non-rotationally-symmetrical, diffractive microrelief structure.

Diffractive optics opens new possibilities in eyeglass lens development. Diffractive lenses and aberration correctors work on the principle of light diffraction, rather than on light refraction. It is very promising and cost efficient to consider hybrid refractive diffractive optical components. Mechanical sizes of hybrid lens are almost the same as for refractive-only lens, because diffractive portion have the thickness of few microns. The diffractive portion of a hybrid refractive-diffractive lens would be just the microrelief pattern coated, etched or diamond turned on one of the lens surfaces which serves as a substrate for the diffractive pattern.

Diffractive optics have been used in contact and intraocular bifocal lenses, as described for example in Allen L. Cohen U.S. Pat. No. 4,995,714, Allen L. Cohen U.S. Pat. No. 4,162,122, Allen L. Cohen U.S. Pat. No. 4,210,391, Allen L. Cohen U.S. Pat. No. 4,338,005, and Allen L. Cohen U.S. Pat. No. 4,340,283, which patents are hereby incorporated by reference. However, in so far as we are aware, diffractive optics have not yet been used in progressive multifocal lenses for eyeglasses, in which the diffractive structure in the zones is not rotationally symmetrical.

Further features and advantages of the invention will be apparent from the description below.

BRIEF DESCRIPTION OF THE DRAWINGS

The invention is hereby described, somewhat diagrammatically and by way of example only, with reference to the accompanying drawings, wherein FIG. 1 schematically illustrates a progressive multifocal eyeglass lens showing the optical power distribution achievable by the diffractive microrelief structure of the present invention.

DESCRIPTION OF PREFERRED EMBODIMENTS

The drawings illustrate, for purposes of example, a number of preferred constructions of progressive multifocal eyeglass lenses in accordance with the present invention. In all these constructions the lens comprises along a principle meridian curve, a farsighted vision zone having an optical power corresponding to that required for viewing distant objects; a nearsighted vision zone having an optical power corresponding to that required for viewing near objects; and an intermediate vision zone between, and progressively connecting, the farsighted and nearsighted vision zones. It will be appreciated that the microrelief structure shown in these figures is exaggerated for purposes of clarity.

In the embodiments described below for purposes of example, at least one of the vision zones includes a transparent, non-rotationally-symmetrical, diffractive microrelief structure. Embodiments are described wherein the diffractive microrelief structure is present in only one vision zone, in two vision zones, and in all three vision zones. Preferably, each vision zone of the lens having a transparent microrelef structure also has a refractive power corresponding to the optical power required for the intermediate vision zone, such that the diffractive power of the respective zone, when combined with the refractive power for the intermediate zones, produces the required optical power for the respective zone Also described below are diffractive microrelief structures of a blazed-groove construction, and of a rounded-groove construction.

Figure 1:
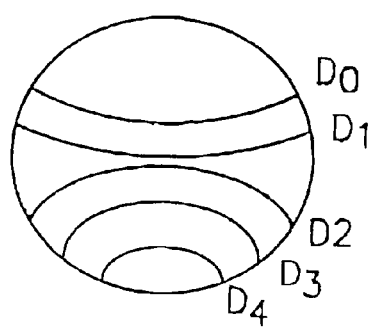

FIG. 1 is an illustration of the optical power distribution achievable in progressive multifocal eyeglass lenses by the diffractive microrelief structure of the present invention. This optical power is described by the function D(u,v,) giving the values of the optical power in diopters for the each point (u,v) on the surface of the glass. The curves denoted by $D_0, D_1, D_2 \ldots$ are the lines with equal values of optical power. The optical power between lines $D_{i-1}, D_i$, has the values in the interval from $D_{i-1}$ up to $D_i$.

The blazed-groove diffractive microrelief structure has grooves with perpendicular walls from one side. The height h(u,v) of the optical facets produced by the grooves (i.e. the depth of the grooves) is measured from the smooth substrate surface and varies within each zone, as well as from zone to zone, but all the variations can be described as a piecewise-continuous function h(u,v) as follows:

$$h(u, v) = \frac{m\lambda}{\mu} \frac{1}{2\pi m} mod_{2\pi m}[\varphi(u, v)] \quad \text{(Eq. 1)}$$

where m- is an integer with a preferable value of 1; λ is the wavelength; μ is a coefficient, related to the refractive index $n_m$ of material of the microrelief (preferably $\mu = n_m - 1$) and φ(u,v) is the continuous phase function of the diffractive microrelief structure.

The phase function of the blazed-groove diffractive microrelief structure present in all three zones, (shown in FIG. 2 as farsighted zone 1, intermediate zone 2 and nearsighted zone 3) of the progressive eyeglasses is related to the residual optical power function D(u,v) as follows:

$$\varphi(u, v) = \frac{\pi(u^2 + v^2)}{\lambda} \frac{D(u, v)}{1000} \quad \text{(Eq. 2)}$$

The term "residue" here and below means the amount of optical power that has to be implemented by diffractive microrelief, considering the initial optical power already implemented by refractive smooth surfaces.

Figure 3:
FIG. 3 illustrates a progressive multifocal eyeglass lens constructed in accordance with the present invention to a provide a blazed-groove diffractive microrelief structure only in the nearsighted vision zone of the lens.

FIG. 3 illustrates a construction including a blazed-groove diffractive microrelief structure present only in the nearsighted zone 3 of the progressive eyeglasses. The other zones include refractive optical surfaces only. In this case, the function φ(u,v) has non-zero values only in the nearsighted portion of the glass area.

Light from the far/intermediate/near objects passes mainly through the farsighted/intermediate/nearsighted zones of the glasses where it is refracted (and also diffracted in the case of the embodiments of FIGS. 2 and 3) so as to be focused by the eye on the retina of the eye.

The main feature of these constructions is that the influence on the slope of the incident beam is achieved not only by refraction in the thick material of the glass, but also by diffraction in the blazed microrelief structure. The latter gives the additional freedom to change the direction of the incident beam without changing the geometrical shape of the glasses.

It should be mentioned that each of these vision zones works only for the respective distance of vision of the object being viewed.

Further improvements can be attained by making a diffractive microrelief structure in one vision zone simultaneously effective for at least one other vision zone. This is achieved by the use of a so called "rounded-groove" diffractive microrelief, that splits each incident beam into a plurality, (e.g. into three) output beams (diffractive orders) with different optical power. The latter technique is presented in FIG. 4 for the rounded-groove diffractive microrelief structure 4 present in the intermediate zone only of the progressive glasses.

Figure 5:
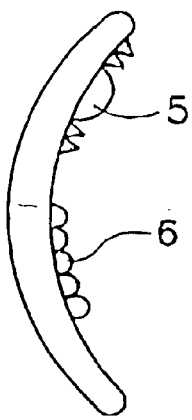
FIG. 5 illustrates a progressive multifocal eyeglass lens constructed in accordance with the present invention to provide a blazed-groove diffractive microrelief structure in the farsighted vision zone, and a rounded-groove diffractive microrelief structure in the intermediate vision zone.

FIG. 5 illustrates a mixed diffractive microrelief arrangement, namely a blazed-groove diffractive microrelief structure in the farsighted zone 5 and a rounded-groove diffractive microrelief structure in the intermediate zone 6 of the progressive glasses.

A diffractive rounded-groove microrelief structure includes a plurality of zones having the height h(u,v), The height h(u,v) varies inside each zone, as well as from zone to zone, but all the variations can be described by a piecewise-continuous function h(u,v) determined by the equation:

$$h(u, v) = \frac{\lambda}{\mu} Q\left(\frac{1}{2\pi} mod_{2\pi}[\varphi(u, v)]\right) \quad \text{(Eq. 3)}$$

where Q(.)is the function describing the shape of the rounded-groove in the diffractive microrelief structure having the phase function ψ(u,v). In the preferred embodiment, Q(.) has the supergaussian form.

$$\text{where } Q(\xi) = \exp\left[-\left(\frac{\xi}{w}\right)^n\right] \quad \text{(Eq. 4)}$$

where n- is the order of the supergaussian function, and w is the relative width parameter chosen in the interval from 0 up to 1.

Figure 4:
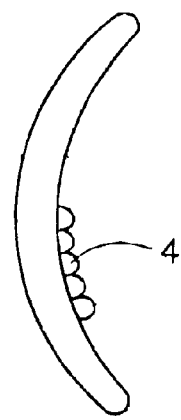
FIG. 4 illustrates a progressive multi-focal eyeglass lens constructed in accordance with the present invention to provide a rounded-groove diffractive microrelief structure only in the intermediate vision zone of the lens.

Light from the far/intermediate/near objects passes mainly through the farsighted/intermediate/nearsighted zones of the glasses and is refracted and also diffracted, by the splitting to the three beams in the case of embodiment of FIGS. 4, 5, so as to be focused on the retina of the eye.

The phase function of the diffractive microrelief structure correcting astigmatism is related to the astigmatic optical power functions $D_x(u,v)$ and $D_y(u,v)$, and orientation angle of astigmatism α(u,v), as follows:

$$\varphi(u, v) = \frac{\pi(x^2 D_x(u, v) + y^2 D_y(u, v))}{\lambda} \frac{1}{1000} \quad \text{(Eq. 5)}$$

where $x = u \cos \alpha(uv) - v \sin \alpha(u,v)$ $y = u \sin \alpha(u,v) + v \cos \alpha(u,v)$ The phase function of the diffractive microrelief structure has a phase function is corresponding to prismatic effects is related to the prismatic coefficients $A_x(u,v)x, A_y(u,v)$ and orientation angle of pismatism β(u,v) as follows $$\varphi(u, v) = \frac{2\pi}{\lambda}[Ax(u, v)x + Ay(u, v)y]$$

where $$x = u \cos \beta(u,v) - v \sin \beta(u,v)$$

$$y = u \sin \beta(u,v) + v \cos \beta(u,v)$$

Figure 6:
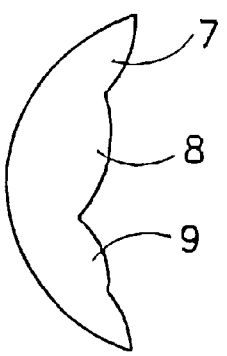
FIG. 6 schematically illustrates a progressive multifocail eyeglass lens constructed in accordance with the present invention to provide a stepped transition, rather than a smooth transition, between the farsighted; nearsighted and intermediate vision zones.

FIG. 6 is a schematic illustration of the faceted progressive glasses with a stepped transition between farsighted vision zone 7, intermediate vision zone 8 and nearsighted vision zone 9. The stepped transition between zones gives the possibility for correcting aberrations in each portion without the limitations of a smooth transition It will be appreciated that one, two or all three of the vision zones could be constructed with the diffractive microrelief structure as described above.

Figure 2:
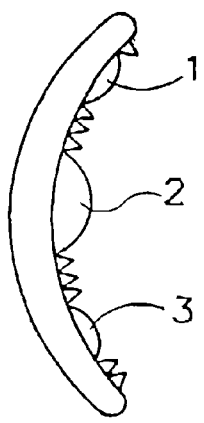
FIG. 2 illustrates a progressive multifocal eyeglass lens constructed in accordance with the present invention to provide a blazed-groove diffractive microrelief structure in all three vision zones of the lens.
Figure 7:
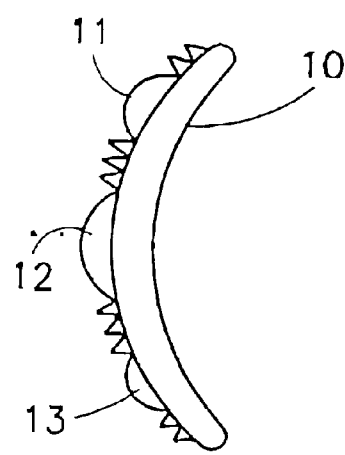
FIG. 7 schematically illustrates a progressive lens similar to that of FIGS. 1 and 2 but with the microrelief relief structure integrally formed on the outer surface of the eyeglass lens.

FIG. 7 schematically illustrates a progressive multifocal eyeglass lens 10 including the microrelief structure of FIGS. 1 and 2 but formed on the outer surface of the eyeglass lens, rather than on the inner surface. Thus, elements 11, 12 and 13 in FIG. 7 correspond to elements 1, 2 and 3, respectively in FIG. 2, but are integrally formed on the outer surface of the lens 10.

Figure 8:
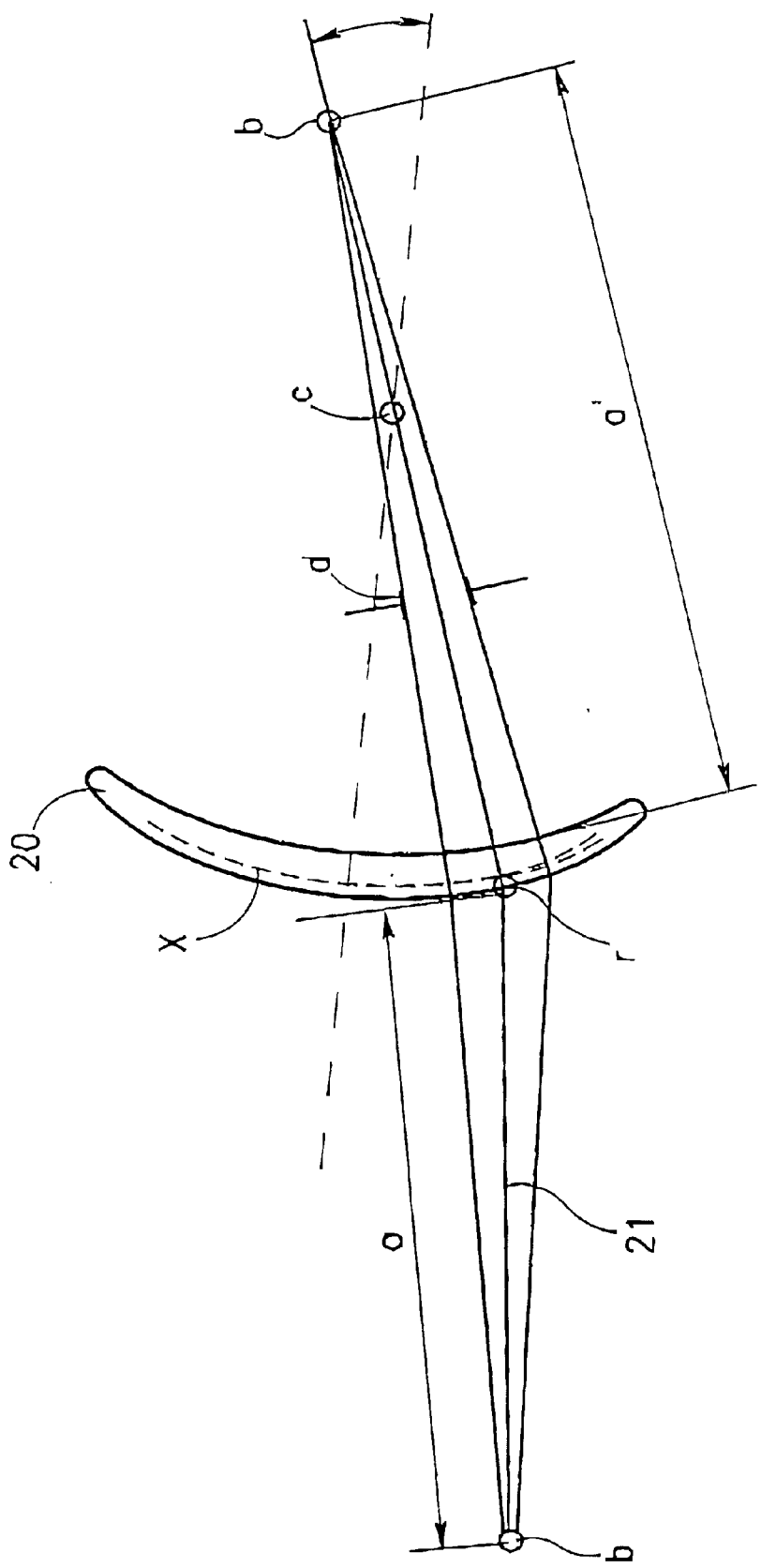
FIG. 8 illustrates an optical scheme for imaging an object by progressive eyeglasses.

FIG. 8 illustrates an optical scheme for imaging an object by progressive eyeglasses in which the microrelief structure, schematically indicated at x, is also integrally formed on the outer surface of the eyeglass lens 20. In FIG. 8, a is the vision distance: a' is the intermediate image distance; b is the object being viewed; c is the position of the image formed by the eyeglasses; d is the eye-rotation center; e is the aperture diaphragm of the optical system (eye-pupil model), and line 21 illustrates the local direction of view.

The microrelief structure x, integrally formed on the outer surface of the eyeglass lens 20, has a phase function related to the geometry of the optical scheme in such a way that the derivatives of the phase function are equal to the difference between the local directional sines of:

a) the chief rays emerging from the object of vision b towards point r on the eyeglass surface and then refracted by the eyeglasses in accordance with the local thick-lens equations in the vicinity of the point r; and b) the direction of the rays from point r on the eyeglass surface towards the position c of the local intermediate image a', defined by the equations in the vicinity of the point r.

$$a' = \frac{1000}{D + D_{add}}$$

where

D is the prescription of the optical power at far vision necessary for the patient; and $D_{add}$ is the local addition to the optical power in progressive eyeglasses defined on the basis of the prescription necessary for the patient's near and intermediate vision.

Light from the object b is refracted by the glass material of the eyeglasses and is diffracted by the diffractive microrelief so as to focus exactly at the intermediate image of the object. The position of the intermediate image created by the eyeglasses is chosen in accordance with the patient's vision-correction prescription to locate the final image exactly on the retina of the eye.

While the invention has been described with respect to several preferred embodiments, it will he appreciated that these are set forth merely for purposes of is example and that many other variations, modifications and applications of the invention may be made.

What is claimed is:

1. A progressive multifocal lens for eyeglasses, comprising, along a principle meridian curve: a farsighted vision zone having an optical power corresponding to that required for viewing distant objects; a nearsighted vision zone having an optical power corresponding to that required for viewing near objects; and an intermediate vision zone between and progressively connecting the farsighted vision zone and the nearsighted vision zone; characterized in that at least one of said vision zones includes a transparent, non-rotationally-symmetrical, diffractive, microrelief structure, said structure comprising a plurality of grooves, each of which grooves are in phase with each other.

2. The lens according to claim 1, wherein each of said vision zones of the lens having said transparent microrelief structure also has a refractive power corresponding to the optical power required for the intermediate vision zone, such that the diffractive power for the respective zone, when combined with the refractive power of the intermediate vision zone, corresponds to the required optical power for the respective zone.

3. The lens according to claim 1, wherein said diffractive microrelief structure is integrally formed on the inner surface of said lens.

4. The lens according to claim 1, wherein said diffractive microrelief structure is integrally formed on the outer surface of said lens.

5. The lens according to claim 1, wherein said diffractive microrelief structure is a blazed-groove microrelief structure.

6. The lens according to claim 1, wherein said diffractive microrelief structure is a rounded-groove microrelief structure.

7. The lens according to claim 6, wherein said rounded-groove microrelief structure splits each incident beam into a plurality of output beams with different optical powers.

8. The lens according to claim 7, wherein said rounded-groove microrelief structure is in said intermediate vision zone of the lens.

9. The lens according to claim 1, wherein said diffractive microrelief structure is only present in one of said vision zones.

10. The lens according to claim 1, wherein said diffractive microrelief structure is present in two of said vision zones.

11. The lens according to claim 1, wherein said diffractive microrelief structure is present in all three of said vision zones.

12. The lens according to claim 1, wherein the lens is formed with a smooth transition from one vision zone to the next adjacent vision zone.

13. The lens according to claim 1, wherein the lens is formed with a stepped transition from one vision zone to the next adjacent vision zone.

14. The lens according to claim 1, wherein said diffractive microrelief structure is of a blazed-groove construction defining facets having a height h(u,v) varying as follows:

$$h(u, v) = \frac{m\lambda}{\mu} \frac{1}{2\pi m} mod_{2\pi m}[\varphi(u, v)]$$

where m- is an integer with a preferable value of 1; $\lambda$ is the wavelength; $\mu$ is a coefficient, related to the refractive index $n_M$ of material of the microrelief ($\mu = n_M - 1$); and $\phi(u,v)$ is the phase function of the diffractive microrelief structure.

15. The lens according to claim 1, wherein said diffractive microrelief structure is of a roundedroove construction defining facets having a height h(u,v) varying as follows:

$$h(u, v) = \frac{\lambda}{\mu} Q\left(\frac{1}{2\pi} mod_{2\pi}[\varphi(u, v)]\right)$$

where Q(.) is the function describing the shape of the rounded-groove in the diffractive microrelief structure having the phase function ψ(v,v).

16. The lens according to claim 1, wherein said diffractive microrelief structure is of a blazed-groove construction having a phase function φ(u, v) related to the residual optical power function D(u,v) as follows:

$$\varphi(u, v) = \frac{\pi(u^2 + v^2)}{\lambda} \frac{D(u, v)}{1000}.$$

17. The lens according to claim 1, wherein said diffractive microrelief structure has a phase function related to the astigmatic optical power function $D_x(u,v)$, $D_y(u,v)$, and orientation angle of astigmatism α(u,v), as follows:

$$\varphi(u, v) = \frac{\pi(x^2 D_x(u, v) + y^2 D_y(u, v))}{\lambda} \frac{1}{1000}$$

where x=u cos α(uv)−v sin α(u,v)

y=u sin α(u,v)+v cos α(u,v).

18. The lens according to claim 1 wherein said diffractive microrelief structure has a phase function related to the prismatic coefficients $A_x$ (u,v,)x, $A_y$(u,v) and orientation angle of prismatics β(u,v) as follows:

$$\varphi(u, v) = \frac{2\pi}{\lambda}[Ax(u, v)x + Ay(u, v)y]$$

where x=u cos β(uv)−v sin β(u,v)

y=u sin β(uv)+v cos β(u,v).

19. The lens according to claim 1 wherein said diffractive microrelief structure has a phase function related to the geometry of the optical scheme in such a way that the derivatives of the phase function are equal to the difference between the local directional sines of:

a) the chief rays emerging from the object of vision towards a predetermined point r on the glass surface and then refracted by the eyeglasses in accordance with the local thick-lens equations in the vicinity of the point r, and b) the direction from point r on the glass surface towards the position of the local intermediate image a', defined by the equations in the vicinity of the point r:

$$a' = \frac{1000}{D + Dadd}$$

where

D is the prescription of the optical power at far vision necessary for the patient; and $D_{add}$ is the local addition to the optical power in progressive eyeglasses defined on the basis of the prescription necessary for the patient's near and intermediate vision.

* * * * *